Sept. 4, 1945.   G. A. DE VLIEG   2,383,958
MACHINE FOR BORING
Filed July 25, 1942   7 Sheets-Sheet 1
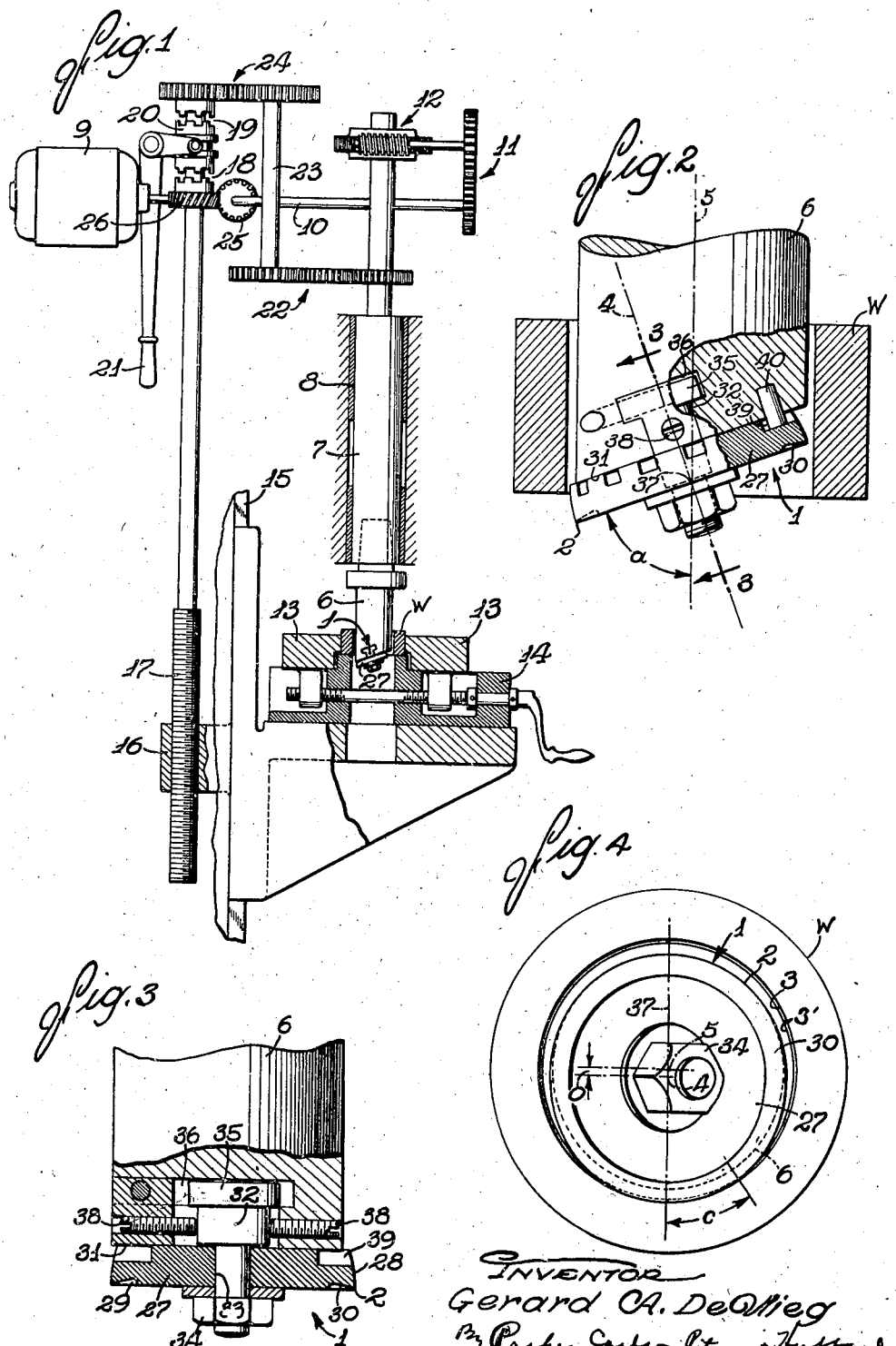

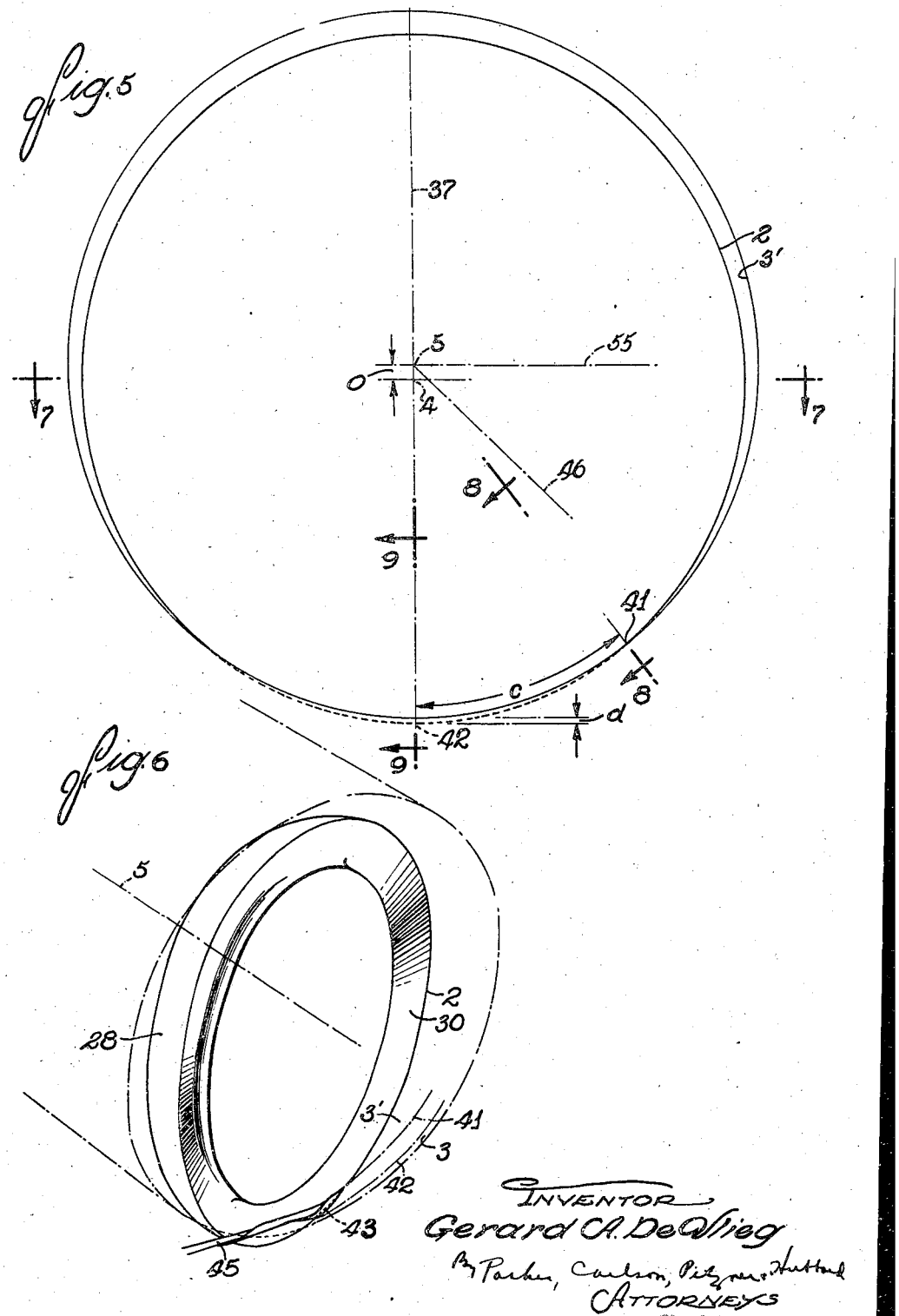

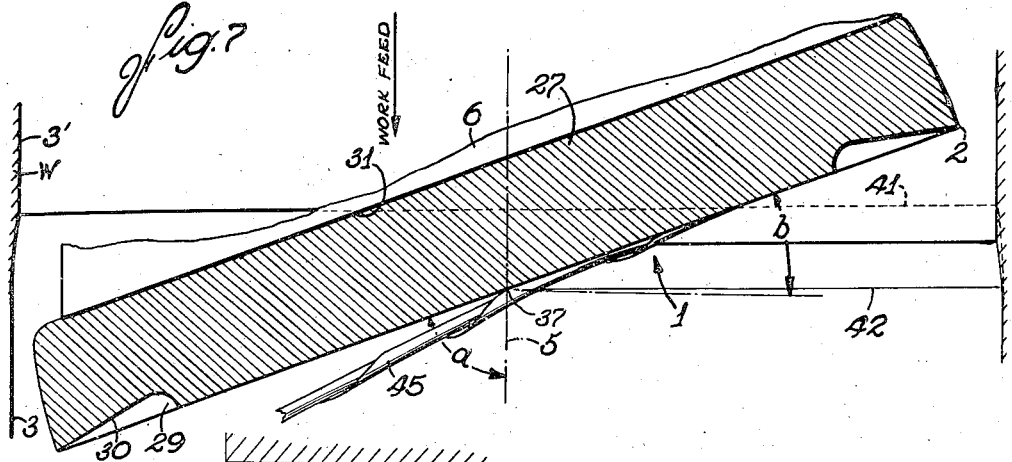
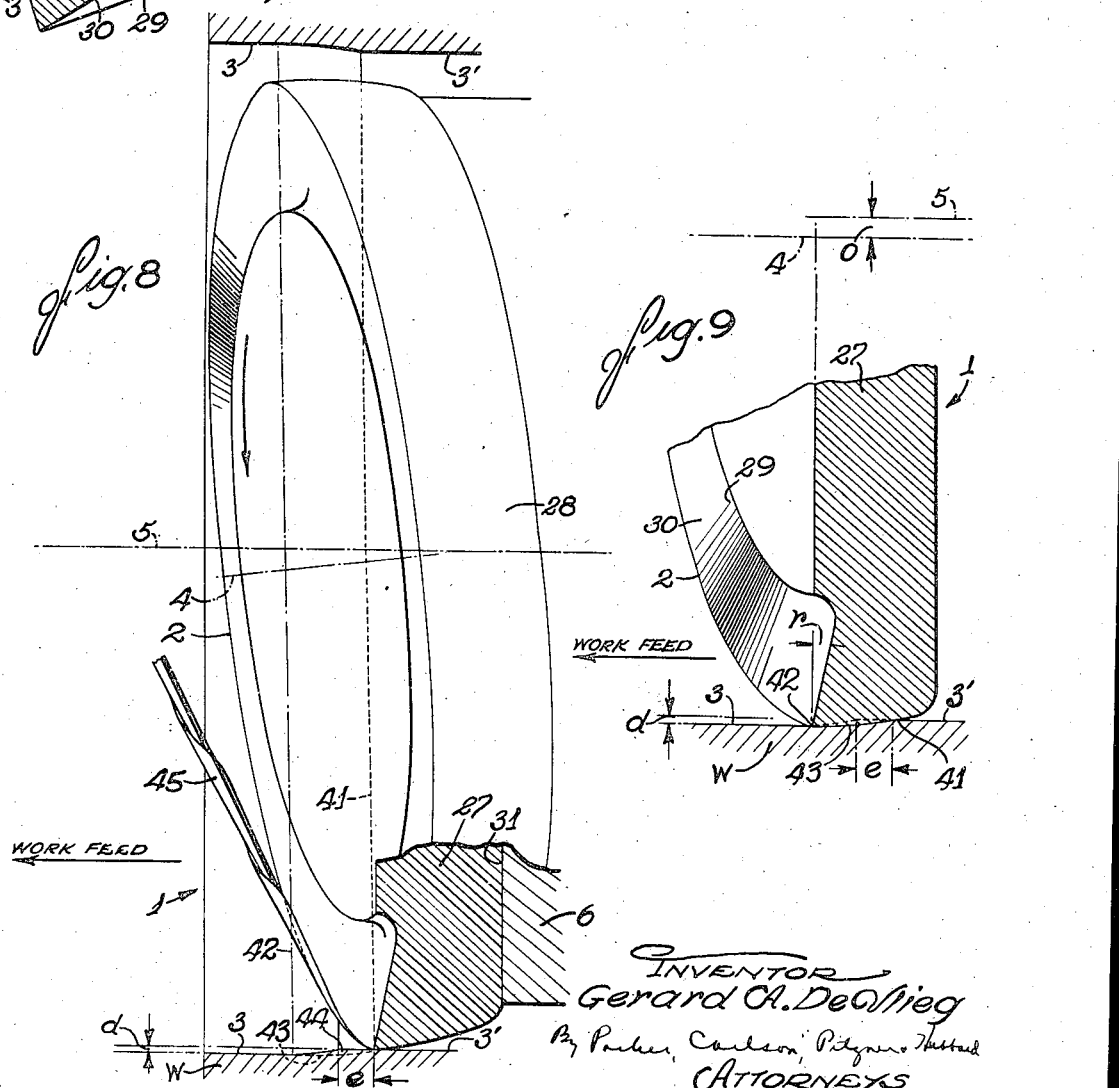

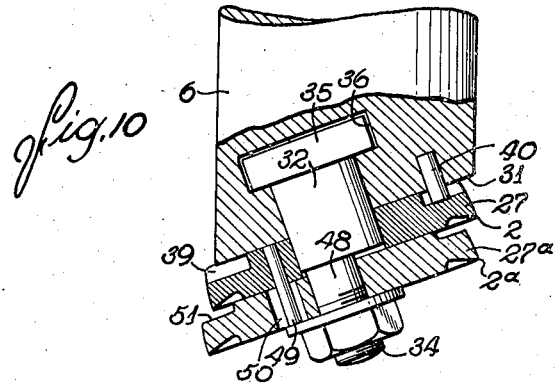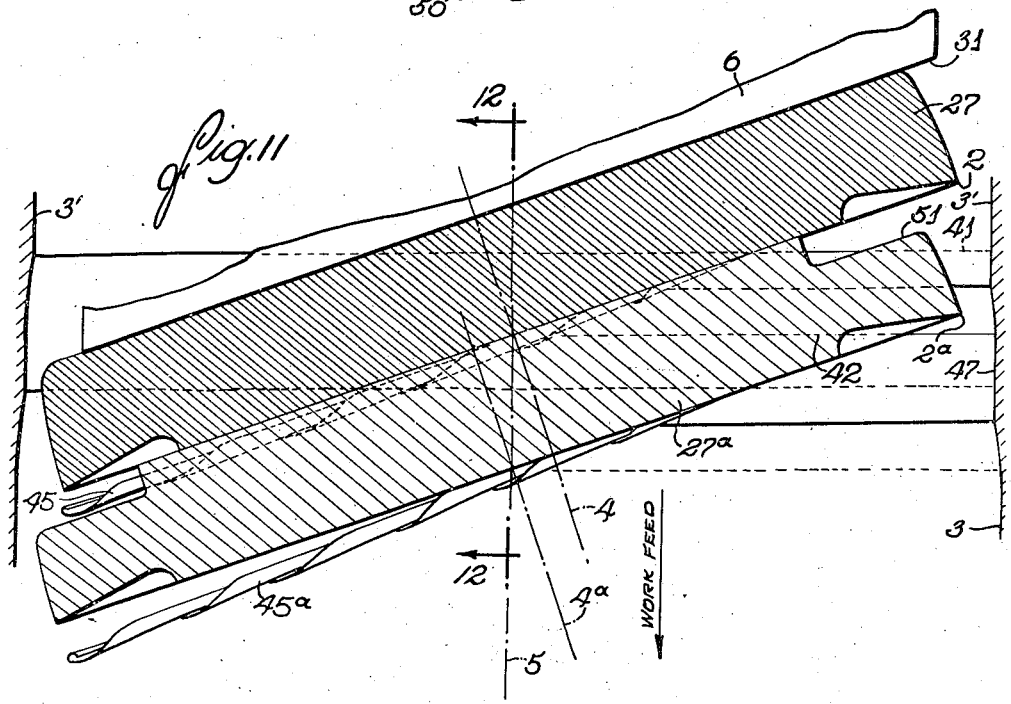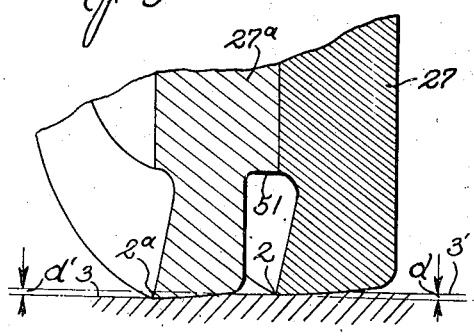

Sept. 4, 1945.   G. A. DE VLIEG   2,383,958
MACHINE FOR BORING
Filed July 25, 1942   7 Sheets-Sheet 5

INVENTOR
Gerard A. DeVlieg
BY
Parker, Carlson, Pitzner & Hubbard
ATTORNEYS

Sept. 4, 1945.   G. A. DE VLIEG   2,383,958
MACHINE FOR BORING
Filed July 25, 1942   7 Sheets-Sheet 6
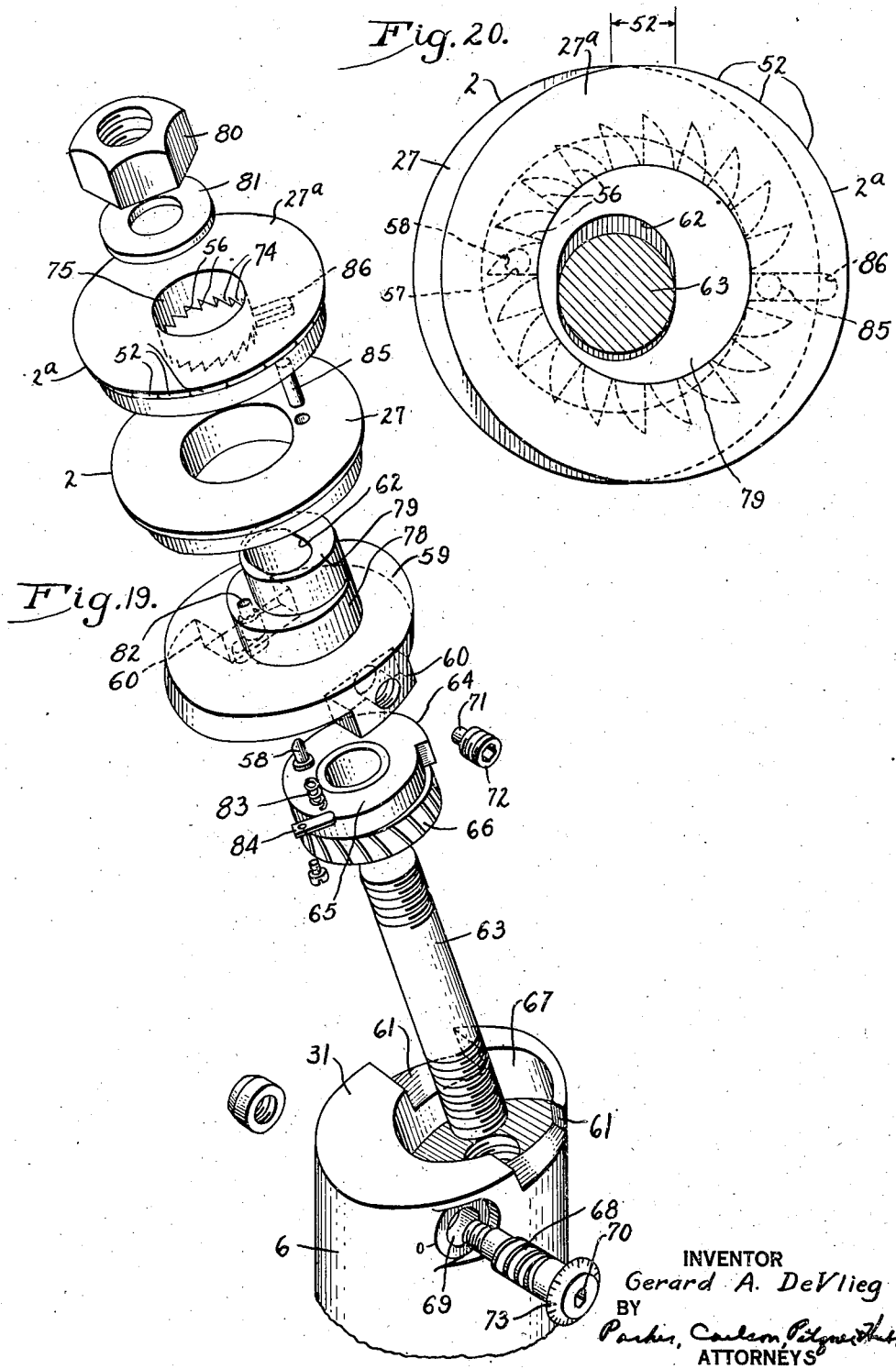
INVENTOR
Gerard A. DeVlieg
BY
ATTORNEYS

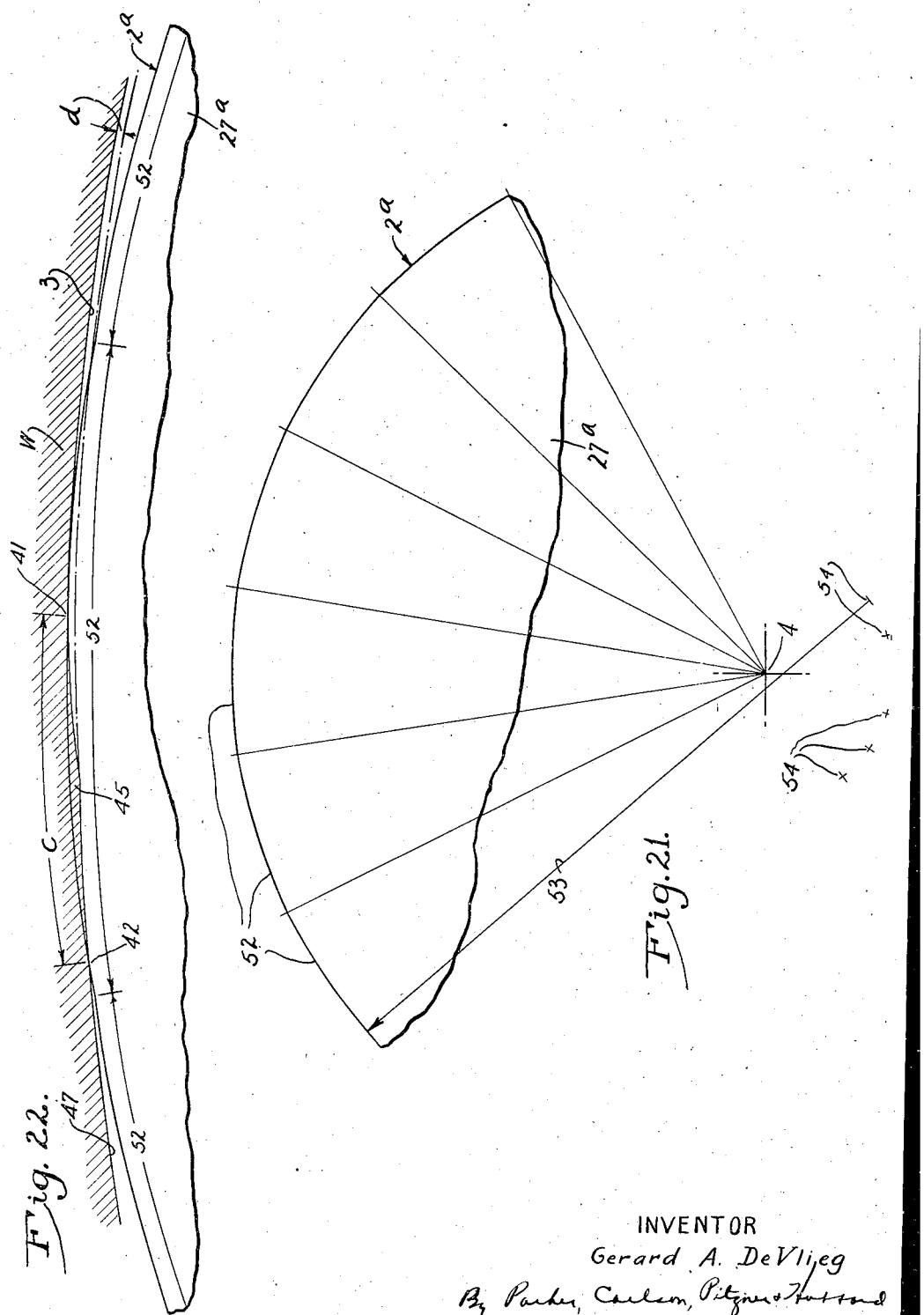

Patented Sept. 4, 1945

2,383,958

UNITED STATES PATENT OFFICE 2,383,958

MACHINE FOR BORING

Gerard A. De Vlieg, Rockford, Ill.

Application July 25, 1942, Serial No. 452,273

25 Claims. (Cl. 77—4)

This invention relates to the removal of metal from the interior of bores to produce a finely finished surface.

The general object is to provide a new and improved metal cutting tool and process by which bores may be machined with greater accuracy and a smoother finish than is possible with metal cutting processes heretofore used thereby obviating the necessity of grinding the finished bore.

A more detailed object is to provide a novel machine and process of boring involving the use of a cutting edge disposed at a relatively large angle to the axis of relative rotation between the work and cutter and having a radius of curvature approximating that of the bore to be finished.

The invention also resides in the novel mounting of a cutting disk so as to present to the work an arcuate cutting edge of substantial length converging very gradually into coincidence with the finished work surface and operating at efficient angles to form a fine finish.

Another object is to improve the fineness of the finish and increase the permissible rate of axial feed through the use of an arcuate cutting edge having a radius of curvature at least equal to and preferably greater than the radius of the finished bore.

A further object is to provide for operation of the cutter with efficient cutting angles including a comparatively large angle of penetration.

Still another object is to provide for operation of two cutting disks in tandem while effectively disposing of the chips removed by the two.

Other objects and advantages of the invention will become apparent from the following detailed description taken in connection with the accompanying drawings, in which Figure 1 is a fragmentary view showing the essential elements of a machine tool for carrying out the present invention.

Fig. 2 is an enlarged view of the boring cutter.

Fig. 3 is a section taken along the line 3—3 of Fig. 2.

Fig. 4 is an end view of the boring cutter and work piece.

Fig. 5 is a diagrammatic end view showing the relation of the cutting edge and the finished work surface during boring.

Fig. 6 is a perspective view of the cutting disk illustrating the chip flow.

Figs. 7, 8, and 9 are diagrammatic views taken along the lines 7—7, 8—8 and 9—9 of Fig. 5.

Figs. 10, 11, and 12 are views similar to Figs. 2, 7, and 9 but illustrating a modified form of cutter.

Figure 13:
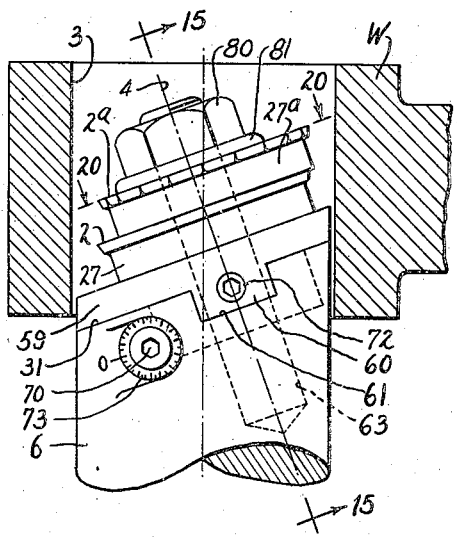

Fig. 13 is a view similar to Fig. 10 illustrating a further modification of the double cutter.

Figure 14:
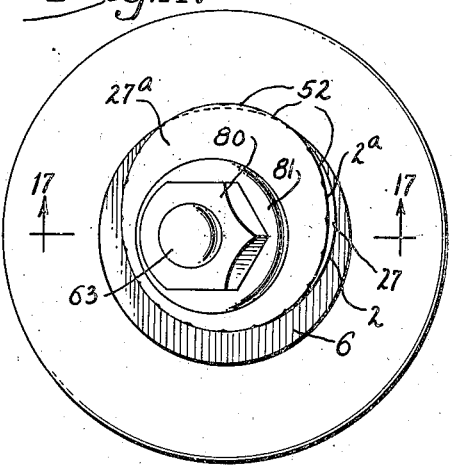

Fig. 14 is an end view of the cutter shown in Fig. 13.

Figure 15:
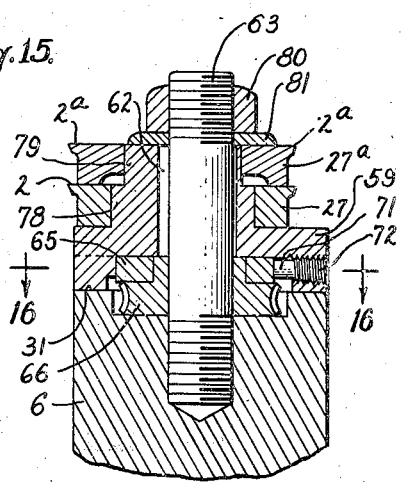

Fig. 15 is a section taken along the line 15—15 of Fig. 13.

Figure 16:
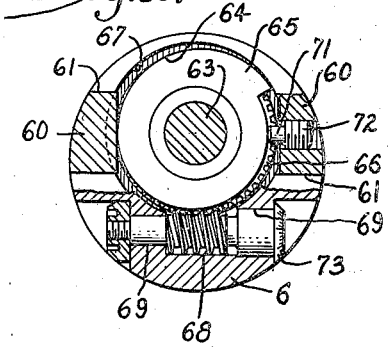
Figure 17:
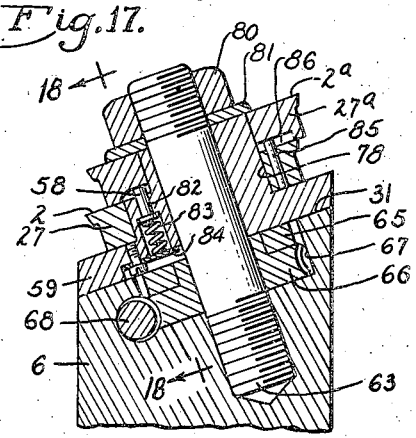

Figs. 16 and 17 are sections taken along the lines 16—16 and 17—17 of Figs. 15 and 14 respectively.

Figure 18:
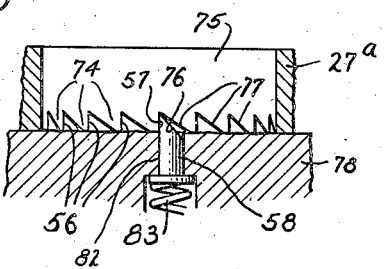

Fig. 18 is a section taken along the line 18—18 of Fig. 17.

Fig. 19 is an exploded perspective view of the modified cutter.

Fig. 20 is a section taken along the line 20—20 of Fig. 13.

Fig. 21 is an enlarged fragmentary face view of the modified finishing cutter.

Fig. 22 is a fragmentary face view on a still larger scale illustrating the penetration of the work by the preferred form of finishing cutter.

While the invention is susceptible of various modifications and alternative uses and is capable of being practiced in a variety of machines, I have illustrated in the drawings and will herein describe the preferred embodiments of the invention and typical machines and ways for practicing the same. I do not intend, however, to limit the invention by such exemplary disclosure but aim to cover all modifications and alternative methods, constructions and uses falling within the spirit and scope of the invention as expressed in the appended claims.

As illustrated in the drawings, the improved method of boring involves the use of a cutter 1 having a generally circular cutting edge 2 of a diameter approaching or larger than that of the finished bore 3 to be formed in the work piece $w$ and mounted with its axis 4 disposed at a large acute angle $a$ to the axis 5 of the bore and offset laterally therefrom so that a substantial arc of the cutting intersects the metal to be removed. Boring is effected by relatively rotating the work and cutting edge about the axis 5 while the cutter and work are being fed relative to each other along such axis. Owing to the angle of the cutting edge and its large radius of curvature relative to the bore, a substantial circumferential length of the edge engages the work and converges so gradually into coincidence with the finished surface 3 that a shaving cut of substantial width is taken at a large effective shear angle resulting in an extremely fine and accurate finish.

The improved boring process may be practiced in various types of machines. In the one illustrated, the cutter 1 is fixed on the end of a body 6 which is received in and coupled to a spindle 7 journaled in bearings 8 and driven from a motor 9 through a shaft 10, pick off gears 11 and worm gearing 12. The work piece herein shown as a ring is gripped by clamps 13 and mounted on a support 14 which is moved vertically to obtain the required feeding movements. For this purpose, the support is slidable along ways 15 and carries a nut 16 threading onto a screw 17 which may be rotated in opposite directions by engagement of clutches 18 and 19 respectively having a common driven member 20 splined on the screw shaft and shiftable axially by a hand lever 21. In the present instance, the downward movement is at feeding speed and accordingly the driving member of the clutch 19 is driven from the spindle 7 through gearing 22, a shaft 23 and pick off gears 24. Upward movement is imparted to the work supported at a rapid traverse rate, this being accomplished by rotating the driving member of the clutch 18 through a spiral gear 25 fast on the motor shaft meshing with a spiral gear 26 rigid with the clutch member and loose on the screw shaft.

Now considering the cutter in the form shown in Figs. 1 to 11, the edge 2 is a complete circle formed around the outer periphery of a generally flat metal disk 27. The peripheral surface 28 is relieved to provide the necessary clearance for the cutting edge. To provide for minimum clearance and therefore maximum support for the cutting edge, the surface is of convex section and constitutes a portion of a spherical surface of a diameter only slightly greater than that of the edge 2. A groove 29 is formed around the end face of the disk to locate the cutting face 30 of the edge 2 at the desired rake angle $r$ later to be described.

The disk is clamped rigidly against the end of a body 6 but is adapted for step-by-step angular adjustment to present different arcs of the cutting edge for active engagement with the work. Preferably, the end 31 of the body is inclined at the angle $b$ at which the cutting edge 2 is to be disposed relative to the plane of rotation, this surface being elliptical when the cutter body 6 is cylindrical as shown. This is an acute angle less than forty-five degrees and for reasons to appear later, an angle of approximately twenty degrees is preferred.

The disk is mounted on the body 6 to permit of bodily edgewise adjustment laterally of the cutter axis and thereby determine the depth of cut and also of angular adjustment to bring successive arcuate portions of the edge into active cutting engagement with the work. As shown in Figs. 2 and 3, these adjustments are made possible by fastening the disk to the body by a T-bolt 32 extending through a hole 33 in the center of the disk and having a clamping nut 34 threaded onto its projecting end. The head 35 of the bolt slides in a complemental slot 36 cut in the body 6 and disposed at an angle such, in the present instance, that the disk is adjustable along a line 37 (Figs. 2 and 4) which lies in the plane of the cutting edge 2, and is parallel to the minor axis of the ellipitical end surface 31 of the cutter body 6 and to the major axis of the ellipse formed by projection of the cutting edge onto a plane of rotation. To lock the disk positively against edgewise movement, set screws 38 are threaded into opposite sides of the cutter body (Fig. 3) with their ends bearing against opposite sides of the bolt 32.

Angular adjustment of the disk may be obtained by providing notches 39 in the back of the disk spaced around the periphery of the latter and adapted to receive a pin 40 projecting from the body end. The adjustment is effected by loosening the nut 34 sufficiently to permit turning of the disk until the next notch is presented to the pin whereupon the nut is tightened. The spacing of the notches is somewhat greater than the angular length of the arc of engagement between the cutting edge and the work so that a fresh cutting edge is presented to the work by each adjustment of the disk.

With the cutter mounted as above described, boring is effected by rotating the spindle while simultaneously relatively feeding the cutter and work axially of the latter in one direction or the other. Preferably, the direction of feed is such, as indicated in Figs. 7 and 8, that the cutter is withdrawn through the rough bore as a result of which the cutting edge 2 enters on the rough surface 3' and passes out of engagement on the finished surface 3.

In view of the preferred direction of feed, the cutter is, by upward movement of the work support 14, first rapidly traversed through the work as by engagement of the clutch 18. Then the work is clamped in place with the axis of the finished bore to be formed coincident with the spindle axis. The depth of cut $d$ (Fig. 9) is of course determined by the degree of the offset $o$ of the disk axis relative to the rotational axis. With the cutter rotating in the direction indicated by the arrow in Fig. 8, the clutch 19 is engaged causing the clamped work piece to be fed downwardly a distance $e$ per revolution of the cutter. As the active arc $c$ of the cutting edge progresses helically around the rough bore and from the lower to the upper end thereof, one end portion of the arc penetrates the rough work surface along a helical line 41 while the trailing end of the arc emerges on the finished surface 3 along the line 42. The intervening part of the arc engages the work along a curved line 43 which it will be observed has its greatest curvature adjacent the rough surface 3' and merges very gradually into coincidence with the finished surface 3. Because the angle of emergence is so small and the angle of penetration a maximum considering the small difference in sizes between the cutter and the bore, efficient cutting action is obtained coupled with prolonged cutter life and the desired fine finish. The large shear angle, approximately seventy degrees, effective on the cutting arc also contributes to the cutting efficiency and the smoothness of the finish. Because of this very large angle, the chip 45, whose cross-section is indicated at 44 (Fig. 8), is caused to curl as shown in Figs. 6 to 8 and flow quite close to the face of the disk. This chip is bent by engagement with the finished bore and deflected downwardly and out of the way. It will be observed that the chip is of substantial width which permits of the desired rate of feed while maintaining the proper finish. Because of its substantial width, the chip thickness and therefore the wear on the cutting edge is reduced correspondingly.

The angle $b$ at which the cutting edge is set is a compromise of several factors. By increasing the angle, the effective shear angle is of course decreased, the width of the chip is increased and the effective arc $c$ of engagement with the work is shortened and is of greater curvature resulting in a corresponding decrease in the smoothness of the finished surface at a given feed rate. Accordingly, in order to obtain optimum cutting efficiency and fineness of finish, the angle $b$ is reduced as much as possible consistent with the maintenance of a satisfactory chip width. For these purposes, the angle is less than forty-five degrees and preferably about twenty degrees as shown.

The cutting action, the smoothness of the finish and the permissible feed rate are also influenced by the angle at which the disk is offset from the cutter axis. With the disk offset as shown along the line 37 (Fig. 5) the shear angle at which the cutter acts will be a minimum for a given disk angle $b$. Also, the arc of engagement of the edge 2 with the work will be reduced but ample, nevertheless, for producing the desired fine finish on the work. The width of the chip and, therefore, the permissible rate of feed for a given finish will be a maximum. With this direction of offset, the rake angle $r$ at which the edge 2 acts is due solely to the groove 29, for if the disk were formed with a flat face by omission of the groove, the edge 2 would have no rake.

On the other hand, if the disk were offset at right angles to its present offset, that is, along the line 55 (Fig. 5) parallel to the major axis of the elliptical surface 31, the shear angle would approach ninety degrees and the chip width would be a minimum although the arc of contact with the work would be a maximum. Obviously, neither efficient cutting action nor satisfactory production would be obtained. By offsetting the disk at intermediate angles, any desired combination of conditions may be obtained. Thus, with the offset along a line 46 (Fig. 5) midway between the lines 37 and 55, the rake and shear angles would be satisfactory even without the groove 29 and the desired smooth finish could be obtained. It is preferred, however, to increase the permissible feed rate even at some small sacrifice in the arc of contact with the work. Accordingly, the direction of offset of the disk is, in the present instance, along the line 37.

As above described, it is preferred to relatively feed the work and cutter in a direction to, in effect, draw the cutter backwardly through the rough work bore 3′. This is advantageous in that the active portion of the cutting edge enters the work on the rough surface and, therefore, at a greater angle than that at which the point would enter on the finished surface if the direction of feed were reversed. Because of this more favorable angle at which the edge penetrates the metal, wear on the edge is reduced appreciably and a much longer cutter life is obtained which is another factor contributing to the fineness of the finish. These advantages obtain at some small sacrifice in chip width which necessitates a correspondingly slower feed rate in order to produce a given smoothness.

The boring process as above described lends itself to the use of two cutting disks arranged in tandem to take successive cuts in one operation thereby removing a metal layer of given thickness in two or more steps with a consequent improvement in the smoothness and accuracy of the finish. One such arrangement is shown in Figs. 10 to 12 and another is illustrated in Figs. 13 to 22. Referring first to Figs. 10 to 12, the disk 27 is mounted as previously described and adapted to cut to a depth 47. A second disk 27ª abuts against the face of the disk 27 and is adjustable angularly around an offset portion 48 of the clamping bolt 32. The amount of the offset is such as to bring the point of intersection of the cutter axis 5 and the plane of the cutting edge 2ª into alinement longitudinally of the work bore. Thus, the two disks may be adjusted to depth in unison by shifting the bolt along the T-slot 26. A pin 49 projecting from the disk 27 is received in a radial slot 50 in the disk 27ª to cause adjustment of this disk in unison with the step-by-step angular adjustments of the disk 27. Preferably, the back of the disk 27ª is under cut around its periphery as indicated at 51 to facilitate the disposal of chip 45 cut by the edge 2. The disk 27ª is made slightly larger than the disk 27 by an amount equal to the depth $d'$ to which the edge 2ª is to cut.

During actual boring, which occurs in the manner described above, the chips 45 and 45ª flow closely along the faces of the respective disks as shown in Fig. 11. The groove 51 allows ample space for proper flow of the chip 45 which bends downwardly and flows through the space between the finished bore and the periphery of the disk 27ª which space is of sufficient width to permit of downward escape of the chip without interference. It will be observed that this effective disposal of the chips is facilitated by, in effect, feeding the cutters backwardly through the bore. Since the centers of both disks are offset in the same direction from the cutter axis, their edges 2 and 2ª act at the same cutting angles and remove chips of the same widths.

I have discovered that it is possible, by a slight modification in the construction of the finishing disk 27ª, to improve substantially the smoothness of the finish produced on the final work surface 3 and at the same time to increase materially the permissible rate of axial feed between the cutter and the work, and therefore the capacity of the tool. Figs. 13 to 21 illustrate such a modification. In this, the cutting edge 2ª, instead of being perfectly circular as in the case of the cutter shown in Fig. 10, is composed of a series of true arcs 52 each intersecting the adjacent arcs and having a radius 53 of curvature somewhat greater, approximately 12 per cent in the present instance, than the radius of the finished bore 3. The included angle of each arc 52 is about 18 degrees in the present instance but this will vary with various factors including the depth of the finishing cut, the inclination of the cutting edge 2ª relative to the bore axis, etc.

Herein, each arc 52 is centered relative to a radius extending through the center 4 of the disk and the centers 54 of curvature of the successive arcs are spaced around the disk center. The length of the radius 53 is of course less than the minor axis of the ellipse formed by the intersection of the work bore 3 with the plane of the cutting edge 2ª with the result that, when the disk is positioned properly, only one of the arcs 52 will engage the work. (See Fig. 20.)

It will be apparent that by virtue of the greater radius of curvature of the active cutting arc 52, a substantially greater length of the latter will enter the work than with the finishing cutter shown in Fig. 10, all other conditions being the same. For the same reason, a substantially greater length of the arc will penetrate the work as indicated between the points 42 and 41 of entry and emergence and the arc will converge more gradually into coincidence with the finished bore 3. Because of the greater length of contact between the cutting edge and the work, the chip 45 removed is correspondingly wider for a given depth of cut and, as a consequence, the permissible rate of feed may be increased correspondingly as compared to the form of finishing cutter first described. For example, a cutter constructed and mounted as shown in Figs. 13 to 22 with arcs 52 of 1.115 inch radii has been fed at .010 of an inch per revolution in taking .005 of an inch of steel stock to form a finish bore 2.042 inches in diameter. This is several times as fast as the feed rate attainable in boring similar stock with a single point boring tool and at the same time a much better finish is obtained.

It is of course necessary that the active arc 52 overlap the points 42 and 41 of entry into and emergence from the work, and it is desirable that the amount of overlap be kept at a minimum in order that as many arcs as possible be included on the disk 27ᵃ. This makes it desirable to position the disk 27ᵃ relative to the cutter body 6 in bringing a new arc 52 into active cutting position. The invention therefore contemplates the provision of a novel means for gauging the angular adjustment of the disk. This means includes an annular series of stops 56 extending radially in the present instance and each being located accurately relative to one of the cutting arcs 52. These stops are engageable with a coacting abutment 57 on a pin or pawl 58 so located that when one of the stop surfaces contacts the pin as shown in Fig. 20, the corresponding arc 52 will be in the correct position to produce the contemplated cutting action. That is to say, each arc 52 is ground on the disk 27ᵃ in an exact relation to one stop 56 by which the arc is located by engagement with the abutment 57 in the final assembly.

Figs. 13 to 20 illustrate the manner of mounting the finishing cutter disk 27ᵃ to obtain the fine adjustment above described and also to permit the roughing or finishing edges 2 and 2ᵃ to be adjusted radially to thereby determine the depth of cut and the finished diameter of the work bore. To these ends, an annular member 59 lies against the inclined end 31 of the body 6 and has keys 60 which seat in ways 61 in the end of the body so as to guide the member 59 in its radial adjustment which is in the direction desired of offset of the cutter disks. Such adjustment is permitted by providing an oblong hole 62 through the member 59 to receive a stud 63 screw threaded into the end of the body 6 at right angles to the end surface 31. Such adjustment is effected by the extremely gradual rise 64 on a cam 65 which is rigid with a worm wheel 66 seated in a recess 67 in the body end. The wheel meshes with a worm 68 journaled in bearings 69 in the body with its outer end exposed at the periphery of the body and having a socket 70 for reception of a tool by which the worm may be turned to rotate the cam. The latter is disposed between the worm wheel 66 and the member 59 and its surface 64 contacts a follower 71 on a screw 72 threaded into the member 59. Thus, by turning the worm, the member 59 will be shifted radially a distance which may be gauged by observing a dial 73. The graduations on the latter and the rise of the cam surface 64 are correlated so that the disk 27ᵃ and the active cutting arc 52 will be fed outwardly or retracted a tenth of a thousandth of an inch for each division of the dial scale. In the present instance, each stop 56 constitutes one side surface of one tooth 74 of an annular series cut in the back of the cutter disk 27ᵃ around a central opening 75. The interdental spaces between the teeth are adapted to receive the correspondingly shaped end of the pawl 58 whose inclined end surface 76 coacts with the inclined backs 77 of the teeth.

The roughing cutter 27 lies against the outer side of the member 59 and is received of a hub 78 thereof located eccentrically of the rotational axis so as to provide the proper offset. Similarly, the finishing cutter disk 27ᵃ lies against the disk 27 and is on a smaller extended hub 79 which is also offset to locate the two cutters in proper angular relation to each other. A nut 80 threaded onto the outer end of the stud 63 bears against a washer 81 and serves to clamp the two disks 27 and 27ᵃ against each other and against the member.

The pawl 58 is slidable endwise in a hole 82 in the hub 78 and is urged toward the disk 27ᵃ by a compression spring 83 acting between a head on the pawl and a plate 84 detachably secured to the member 59. When the disk 27ᵃ is turned relative to the supporting member 59 after loosening the nut 80, the back surface 77 of one tooth 74 acts as a cam on the surface 76 of the pawl thereby compressing the spring and depressing the pawl to allow the disk 27ᵃ to advance. As the stop surface 56 on the next tooth passes the abutment surface 57 on the pawl, the latter is urged forwardly into the next tooth space. Then, by turning the cutter disk reversely, the stop and abutment surfaces will be brought into full contact as shown in Figs. 18 and 20 thereby locating a new cutting arc 52 in the proper position for taking the finishing cut. The nut 80 is of course tightened after such adjustment and the cutter is ready for use. It will be observed that the adjustment may be made quickly and conveniently and yet the cutting edge is positioned positively and accurately without the necessity of any skill on the part of the operator.

Provision is made for adjustment of the roughing cutter disk 27 simultaneously and to the same angular extent as the disk 27ᵃ. This is accomplished by a pin 85 carried by the disk 27ᵃ and projecting parallel to the axis thereof into a radial slot 86 in the under side of the disk 27. The pin fits closely in the slot so that the two disks turn together on their respective hubs 78 and 79 as an incident to adjustment of the disk 27ᵃ in the manner described above. At the outset, the disk 27ᵃ is placed against the disk 27 with the pin 85 entering the tooth space next adjacent the slot 86 thereby permitting of step-by-step adjustment of the disk 27ᵃ through substantially a full revolution.

From the foregoing, it will be observed that with the cutters sized, mounted and fed in the manner described, several factors are combined to obtain efficient cutting action and produce an extremely fine finish at feed rates which are satisfactory for modern production machines, and this, in spite of the arcuate shape of the cutting edge. The first of these factors is the curvature of the active cutting edge relative to the finished work surface. This is a true arc and therefore may be duplicated with extreme accuracy on the successsive steps of adjustment. It tapers very gradually into coincidence with the final surface 3 because the diameter is correlated with that of the finished bore and made only slightly smaller than the rough bore in the case of the initially acting cutter 27 and preferably greater than the bore in the case of the finishing cutter 27ᵃ (Figs. 13 to 21). As a result, ultra precision is obtained in the size and finish of the bore and yet the cutter may be fed through the work at an appreciable rate.

This application is a continuation in part of my prior application Serial No. 370,581, filed December 18, 1940.

I claim as my invention:

1. A machine for boring a work piece having, in combination, a support for said work piece, a tool support, means mounting said supports for relative rotation about the work axis and for relative movement therealong, a cutter disk rigid with said tool support and having a circular peripheral cutting edge only slightly smaller than the rough work bore and disposed in a plane inclined more than forty-five degrees to said axis, said disk being offset laterally from said axis according to the thickness of the layer to be removed from the work, and power driven mechanism for relatively moving said supports axially at a feed rate and simultaneously relatively rotating the supports in a direction to cause removal of a helical layer from the work piece.

2. A machine for boring a work piece having, in combination, a support for said work piece, a tool support, means mounting said supports for relative rotation about the work axis and for relative movement therealong, a cutter rigid with said tool support and having a circular peripheral cutting edge only slightly smaller than the rough work bore and disposed in a plane inclined at an angle of approximately seventy degrees to said axis, said edge being offset laterally from said axis according to the thickness of the layer to be removed, and power driven mechanism for relatively rotating said supports and feeding the same along said axis.

3. A machine for boring a work piece having, in combination, a support for said work piece, a tool support, means mounting said supports for relative rotation about the work axis and for relative movement therealong, means fast on said tool support providing an axially facing circular cutting edge only slightly smaller than the rough work bore, said edge being canted relative to said axis and offset laterally from said axis to engage the rough bore to the desired depth, and power driven mechanism for relatively moving said supports axially at a feed rate and simultaneously relatively rotating the supports in a direction to cause removal of a helical layer from the work piece.

4. A machine for boring a work piece having, in combination, a support for said work piece, a tool support, means mounting said supports for relative rotation about the work axis and for relative movement therealong, a cutter rigid with and non-rotatable relative to said tool support and presenting an arcuate cutting edge constituting a portion of a circle disposed in a plane inclined more than forty-five degrees to said axis, and power driven mechanism for relatively rotating said supports and feeding the same along said axis, said edge engaging the work to remove a helical layer therefrom.

5. A machine for boring a work piece having, in combination, a support for said work piece, a tool support, means mounting said supports for relative rotation about the work axis and for relative movement therealong, means rigid with said tool support providing an arcuate peripheral cutting edge disposed in a plane inclined at approximately seventy degrees to said axis, said disk being offset laterally from said axis according to the thickness of the layer to be removed, and power driven mechanism for relatively moving said supports axially at a feed rate and simultaneously relatively rotating the supports in a direction to cause removal of a helical layer from the work piece.

6. A machine for boring a work piece having, in combination, a support for said work piece, a tool support, means mounting said supports for relative rotation about the work axis and for relative movement therealong, power driven means for relatively rotating said supports, a cutter rigid with and non-rotatable relative to said tool support and presenting a generally arcuate cutting edge constituting a portion of a circle disposed in a plane inclined more than forty-five degrees to said axis, said edge being engageable with the work, and power driven mechanism for relatively feeding said supports along said axis in a direction to cause said edge to enter the work on the rough work surface and emerge therefrom on the finished surface.

7. A machine for boring a work piece having, in combination, a support for said work piece, a tool support, means mounting said supports for relative rotation about the work axis and for relative movement therealong, a cutter fast on said tool support presenting an arcuate cutting edge constituting a portion of a circle inclined more than forty-five degrees to said axis and offset laterally therefrom substantially along the line of intersection of said plane and axis whereby to render a portion of said edge engageable with said work piece, and power driven mechanism for relatively rotating said supports and feeding the same along said axis.

8. A machine for removing material from a work piece to form a bore therein having, in combination, a support for said work piece, a tool support, means mounting said supports for relative rotation about the work axis and for relative movement therealong, a cutter rigid with said tool support and having an arcuate peripheral cutting edge with a radius of curvature greater than that of said bore to be finished, said edge lying in a plane inclined at an angle of approximately seventy degrees to said axis and being offset laterally from said axis according to the thickness of the layer to be removed, and power driven mechanism for relatively rotating said supports and feeding the same along said axis.

9. A machine for boring a work piece having, in combination, a support for said work piece, a tool support, means mounting said supports for relative rotation about the work axis and for relative movement therealong, a cutter rigid with and non-rotatable relative to said tool support and presenting an arcuate cutting edge constituting a portion of a circle having a radius at least as great as the rough work bore and disposed in a plane inclined more than forty-five degrees to said axis, and power driven mechanism for relatively rotating said supports and feeding the same along said axis, said edge engaging the work to remove a helical layer therefrom.

10. A machine for removing material from a work piece to form a bore therein having, in combination, a support for said work piece, a tool support, means mounting said supports for relative rotation about the work axis and for relative movement therealong, a cutter fast on said tool support presenting an arcuate cutting edge constituting a portion of a circle of greater radius than said bore and inclined more than forty-five degrees to said axis, said circle being offset laterally from said axis substantially along the line of intersection of said plane and axis whereby to render a portion of said edge engageable with said work piece, and power driven mechanism for relatively rotating said supports and feeding the same along said axis.

11. In a machine for finishing a bore in a work piece the combination of a tool support having a longitudinal axis, a cutter on said tool support having an annular cutting edge lying in a plane which is inclined more than forty-five degrees to said axis and is offset laterally therefrom, said cutting edge being composed of a series of intersecting arcs each having a radius of curvature greater than the overall radius of the edge, means rigidly connecting said cutter and said tool support with one of said arcs along the line of offset adapted for active engagement with a work piece, and means by which said cutter may be adjusted angularly step-by-step in increments corresponding in lengths to the lengths of said arcs whereby to bring the arcs into cutting position successively.

12. In a machine for finishing a bore in a work piece the combination of a tool support having a longitudinal axis, a cutter on said tool support having an annular cutting edge lying in a plane which is inclined more than forty-five degrees to said axis and is offset laterally therefrom, said cutting edge being composed of a series of arcs each having a radius of curvature greater than the overall radius of the edge, means rigidly connecting said cutter and said tool support with one of said arcs adapted for active engagement with a work piece, and means by which said cutter may be adjusted angularly step-by-step in increments corresponding in lengths to the lengths of said arcs whereby to bring the arcs into cutting position successively.

13. In a machine for finishing a bore in a work piece the combination of a tool support having a longitudinal axis, a cutter on said tool support having an annular cutting edge lying in a plane which is inclined more than forty-five degrees to said axis and is offset laterally therefrom, said cutting edge being composed of a series of arcs having radii of curvature greater than the overall radius of the edge, and centers of curvature angularly spaced around the center of said edge, means rigidly connecting said cutter and said tool support with one of said arcs adapted for active engagement with a work piece, and means by which said cutter may be adjusted angularly step-by-step in increments corresponding in lengths to the lengths of said arcs whereby to bring the arcs into cutting position successively.

14. A machine for finishing a bore in a work piece having, in combination, a support for said work piece, a tool support, means mounting said supports for relative rotation about the work axis and for relative feeding movement therealong, a cutter on said tool support having an arcuate cutting edge lying in a plane which is inclined at a substantial angle to said axis and is offset laterally therefrom, said cutting edge having a radius of curvature greater than the radius of the said bore, and means rigidly connecting said cutter and said tool support with said edge adapted for engagement with the work.

15. The method of boring which comprises supporting an arcuate cutting edge in a plane disposed at an angle of more than forty-five degrees relative to the axis of a work piece to be bored and with the edge offset laterally of said axis a distance corresponding to the depth of work material to be removed, relatively rotating said edge and work piece about the axis of the bore to be formed, and relatively feeding said work piece and edge in a direction to cause the edge to enter the work on the rough surface and emerge on the finished surface.

16. A boring cutter comprising a bar having an end surface inclined at an angle of more than forty-five degrees relative to the axis of the bar, and a metal disk clamped rigidly against said inclined end so as to turn with the bar, said disk presenting an arcuate cutting edge disposed in a plane parallel to said end surface and engageable with a work piece to form a cylindrical bore during relative rotation and axial feeding between the work piece and bar about and along the latter.

17. A boring cutter comprising a bar having an end surface inclined at an angle of more than forty-five degrees relative to the axis of the bar, a metal disk lying against said inclined end and defining a peripheral cutting edge offset laterally from said axis along the line of intersection of the axis with the plane of the edge, and means connecting said bar and disk for rotation together and also for angular step-by-step adjustment of the disk relative to the bar to bring successive arcs of said edge into active work-engaging relation.

18. In a cutter of the character described, a disk having an annular peripheral cutting edge divided into a plurality of circumferential arcs each having a radius of curvature greater than the radius of the disk, and an annular series of stop surfaces formed on said disk, one corresponding to each of said arcs and bearing a predetermined angular relation to its arc.

19. A cutter disk having a peripheral cutting edge divided into a series of angularly spaced circumferentially extending arcs each having a radius of curvature greater than the radius of said disk, and an annular series of teeth spaced around said disk and providing stop surfaces bearing a fixed angular relation to the respective arcs.

20. A cutting element having a peripheral cutting edge divided into successive circumferentially extending arcs each having a radius of curvature extending through the center of said element and a center of curvature offset beyond said element center.

21. A cutting element having a peripheral cutting edge divided into successive circumferentially extending arcs each having a center of curvature offset from the center of said edge on the side of the center opposite the arc.

22. A cutter having, in combination, a supporting element, a cutting element having a peripheral cutting edge and mounted on the end of said supporting element for angular adjustment relative thereto to present different portions of said edge for engagement with a work piece, and interengageable shoulders formed on said elements coacting upon turning of the cutting element in one direction to position the latter in one of a plurality of predetermined angular positions, one of said shoulders being yieldable automatically out of the path of the other shoulder upon turning of the element in the opposite direction.

23. A cutter having, in combination, a supporting element, a cutting element having a peripheral cutting edge and mounted on the end of said supporting element for angular adjustment relative thereto to present different portions of said edge for engagement with a work piece, an annular series of recesses in said disk, a pin mounted on said supporting element and yieldably urged into one of said recesses, said pin and one wall of each recess being shaped to effect camming of the pin out of one recess as an incident to turning of said cutting element relative to the supporting element in one direction, and stop surfaces on said pin and cutting element engageable on relative reverse movement of the cutting element to locate the latter in a predetermined angular position relative to the supporting element.

24. A cutter having, in combination, a supporting element, a cutting element having a peripheral cutting edge and mounted on the end of said supporting element for angular adjustment relative thereto to present different portions of said edge for engagement with a work piece, a plurality of angularly spaced stop surfaces on one of said elements, a pin mounted on the other element to yield in a direction transversely of the angular adjustment of the cutting element, and cam surfaces on said pin and said first element coacting during turning of said cutting element in one direction to cause yielding of said pin and the passage of one of said stop surfaces thereby.

25. A cutter having, in combination, a supporting element, a cutting element having a peripheral cutting edge and mounted on said supporting element for rotary adjustment relative thereto, an annular series of teeth on one of said elements, a pawl yieldably mounted on the other element and engaging one side of each of said teeth to locate said cutting element in a predetermined angular position, said pawl yielding upon turning of the cutting element in one direction to present the next tooth for engagement with the pawl.

GERARD A. DE VLIEG.